United States Patent
Barroso et al.

(10) Patent No.: US 10,251,384 B2
(45) Date of Patent: Apr. 9, 2019

(54) LIGHTING SYSTEM FOR INSECT CONTROL

(71) Applicant: SIGNIFY HOLDING B.V., Eindhoven (NL)

(72) Inventors: Andre Melon Barroso, Aachen (DE); Daniël Willem Elisabeth Schobben, Waalre (NL); Willem Piet Van Hoof, Horst (NL); Supriyo Chatterjea, Eindhoven (NL); Oscar Garcia Morchon, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 192 days.

(21) Appl. No.: 15/115,407

(22) PCT Filed: Jan. 15, 2015

(86) PCT No.: PCT/EP2015/050617
§ 371 (c)(1),
(2) Date: Jul. 29, 2016

(87) PCT Pub. No.: WO2015/113818
PCT Pub. Date: Aug. 6, 2015

(65) Prior Publication Data
US 2017/0006848 A1 Jan. 12, 2017

(30) Foreign Application Priority Data
Jan. 29, 2014 (EP) .................................... 14153105

(51) Int. Cl.
*A01M 1/04* (2006.01)
*A01M 29/10* (2011.01)

(52) U.S. Cl.
CPC .............. *A01M 1/04* (2013.01); *A01M 29/10* (2013.01)

(58) Field of Classification Search
CPC ................................. A01M 29/10; A01M 1/04
USPC ........................................................... 43/113
See application file for complete search history.

(56) References Cited

U.S. PATENT DOCUMENTS

| | | | | |
|---|---|---|---|---|
| 4,965,552 A * | 10/1990 | Price | ...................... | A01M 29/16 340/566 |
| 8,458,954 B2 * | 6/2013 | Yamada | .................. | A01G 7/045 250/504 R |
| 9,137,874 B2 * | 9/2015 | Maxik | .................... | H05B 37/02 |
| 2008/0198009 A1 * | 8/2008 | Hoeben | .................. | A01M 29/10 340/541 |
| 2009/0236997 A1 * | 9/2009 | Liu | ......................... | A01M 29/10 315/209 R |
| 2010/0088948 A1 | 4/2010 | Yeh | | |
| 2010/0164394 A1 * | 7/2010 | Liu | .................... | H05B 33/0818 315/287 |

(Continued)

FOREIGN PATENT DOCUMENTS

JP 2006280287 A2 10/2006
JP 2007000102 A2 1/2007

(Continued)

*Primary Examiner* — Magdalena Topolski
(74) *Attorney, Agent, or Firm* — Meenakshy Chakravorty (57) ABSTRACT

An insect control system has a light source arrangement (10) comprising one or more light sources with tunable spectrum, polarization, intensity and or flickering pattern. The system enables a particular type of insect to be attracted or repelled in a particular time period.

12 Claims, 5 Drawing Sheets

(a)

(b)

(56) References Cited

U.S. PATENT DOCUMENTS

| | | | | |
|---|---|---|---|---|
| 2011/0163694 A1* | 7/2011 | Donners | ............... | A01M 29/10 |
| | | | | 315/297 |
| 2014/0169138 A1* | 6/2014 | Lee | ...................... | A01M 29/18 |
| | | | | 367/139 |
| 2014/0373442 A1* | 12/2014 | Aikala | ................... | A01G 7/045 |
| | | | | 47/58.1 LS |
| 2016/0030609 A1* | 2/2016 | Peterson | ................... | A61L 2/08 |
| | | | | 362/84 |

FOREIGN PATENT DOCUMENTS

| | | | |
|---|---|---|---|
| JP | 2007209265 | A2 | 8/2007 |
| JP | 2007289053 | A2 | 11/2007 |
| JP | 2010166845 | A2 | 8/2010 |
| TW | 201021697 | A | 6/2010 |
| WO | 2004010762 | A2 | 2/2004 |
| WO | 2012098484 | A1 | 7/2012 |

\* cited by examiner

LIGHTING SYSTEM FOR INSECT CONTROL

CROSS-REFERENCE TO PRIOR APPLICATIONS

This application is the U.S. National Phase application under 35 U.S.C. § 371 of International Application No. PCT/EP2015/050617, filed on Jan. 15, 2015, which claims the benefit of European Patent Application No. 14153105.3, filed on Jan. 29, 2014. These applications are hereby incorporated by reference herein.

FIELD OF THE INVENTION

This invention relates to a lighting system for control of insects.

BACKGROUND OF THE INVENTION

Despite their importance in a balanced ecosystem, insects are often a source of discomfort, disease and property damage. Because of their extensive impact on humans, many solutions have been proposed over the years to control the population of insects within our habitat. These solutions can be broadly grouped in two main categories according to their mechanism of action; chemical and physical.

Chemical approaches for insect control target the biochemistry of the specific insect target group. A substance is used to destroy (insecticide), or interfere with the behavior of the target organism in some stage of its lifecycle, e.g. repellents. Despite their recognized effectiveness in controlling insect populations, chemical approaches produce undesirable side-effects that range from unpleasant odours to human poisoning.

DEET (N, N-Diethyl-meta-toluamide), the most common active ingredient in insect repellents, is an example of an effective chemical substance for insect control that is nonetheless a harmful substance to humans. DEET is often sold and used in spray or lotion in concentrations up to 100%. The potential health effects of the product are eye, throat and skin irritation as well as central nervous system effects if inhaled. The effect of DEET in inhibiting the activity of the central nervous system enzyme acetylcholinesterase was in fact observed in both insects and mammals. Health concerns over the use of DEET substance triggered the Canadian federal health agency to prohibit insect repellents with concentrations above 30% and discourage the use of the product in the vicinity of children younger than 2 years old.

Icaridin (a.k.a. picaridin) is a largely colorless and odorless substance—also used in insect repellent lotions to be applied on the skin—whose efficacy is comparable to that of DEET. The World Health Organization (WHO) classifies icaridin as a slightly hazardous substance whose risks to people, animals and environment are acceptable. The substance is nevertheless slightly toxic to humans and is absorbed through the skin or via inhalation and its health effects will depend on concentration and frequency of exposure.

Allethrihns are synthetic compounds used in insecticides that present low toxicity to humans and are used in domestic products. The WHO classifies it as a slightly hazardous substance and conditions its safety to appropriate use. It also reports it to be highly toxic to fish and honey-bees.

Lambda-cyhalothrin is an organic compound used in long-lasting insecticides for backyards that is also hazardous to human health and generates a strong and unpleasant smell. Citronella oil is a natural insect repellent obtained from the leaves of lemongrass. The United States Environmental Protection Agency considers citronella oil to be of low acute toxicity that poses minimal risk to the ecosystem. The substance is rather innocuous to humans upon inhalation but displays a strong smell that is not always appreciated. Citronella oils are often dispersed in the air to repel mosquitos by burning an impregnated candle.

Chemical substances with repellent properties are often dispersed in the environment in the format of incense, such as mosquito-coils. However, burning incense creates a fire hazard besides producing a large amount of solid particles and gases in the air. In view of the undesirable by-products generated by mosquito coils, exposure to their smoke can pose significant acute and chronic health risks.

Electrical devices are also often used to disperse chemical substances in the environment. Dispersion is achieved either by heating or spraying (misting) the substance in a controlled manner. This approach does not generate noxious combustion by-products as mosquito coils do, but they are still based on the diffusion of hazardous substances into the environment.

Physical approaches for insect control rely on the use of mechanical barriers or different forms of energy e.g. sound and light, that can affect behavior.

Mechanical barriers normally assume the form of screens or nets placed on windows, doors or around beds. These screens allow for the circulation of air, but the pores are small enough to prevent the entrance of insects in a certain space. Although effective if used correctly, this approach does not address the problem of insects that are already inside the target area.

Sound is used in a range of products intended to repel insects. However the effectiveness of available devices has been strongly questioned. A review by the Cochrane Collaboration, an international entity that supports evidence-based healthcare, concluded from the results of 10 field studies that such devices had no effect on the number of insects caught from the bare body parts of humans.

This invention relates to the use of light for insect control. Various species of insects found in people's residences are either attracted or repelled by light at some stage of their lifecycle. Amongst the insects that show attraction to light many display preference to light sources with more energy in the short wavelengths i.e. blue and ultraviolet. This phenomenon is applied in several devices used as insect traps: blue light sources lure insects to a space where they are either electrocuted by touching filaments (bug zappers) or fumigated.

Effective light traps, however, are known to disturb people in a perceptible way, either visually, audibly or aromatically. Visual disturbance is caused because the light source used to lure must be noticeable so as to attract the insects in the target area. This spatial requirement limits the choice of positioning and dimming the light sources. Audible or aromatic disturbance is caused because traps must be collocated with the light source which implies killing the insects in a nearby visible location. As electrocution generates unnerving noise and smell, and fumigation relies on hazardous substances, effective light traps are not much favored in inhabited spaces. Such traps are mostly relegated to outdoor areas and studies of insect populations.

Insects perceive electromagnetic radiation over a wide range of wavelengths in the visible and near-visible spectra. The photoreceptor cells within their eyes contain different rhodopsins, i.e. visual pigments that react to light of specific wavelengths.

Bichromatic insects express two types of rhodopsins, one with maximum absorption in the UV range and another with maximum absorption in the green range. Some insects are trichromatic and have a third pigment whose absorption peaks at blue wavelengths. Yet another group of insects, particularly some species of Lepidoptera, are tetrachromatic and carry an additional pigment with peak absorption in the red wavelength region.

The perception of light has been observed to play a role in navigation, foraging and meeting sexual partners for both winged and terrestrial insects. This adaptive behavior based on the ability to perceive nuances in environmental lighting conditions, e.g. intensity, polarization and spectral distribution, seems crucial for survival as it maximizes the chances of finding food and mates while avoiding predators.

Many species of insects display phototaxis, i.e. a disposition to move in response to light, either towards or away from the light source. Negative phototaxis facilitates locating shelters to avoid predators while positive phototaxis intermediates the flight response in many flying insects.

Insect phototaxis has practical consequences to their ecology in a world where artificial light increasingly dominates the skyline during nighttime. Artificial light often perverts the natural phototactic behavior of insects driving them away from their habitat. A study in a German city of 240,000 inhabitants estimated that about 360 million insects die per season attracted to street lamps. Insect mortality may negatively impact entire ecosystems through the destabilization of food chains. Besides increasing mortality, the movement of insects to urban environments may bring discomfort, destruction and diseases to humans. A study in Mexico showed that houses closer to public street lights were more likely to be infested with *Triatoma dimidiate*, one of the primary vectors of Chagas disease.

From both the ecological and human wellness perspective there are thus incentives for keeping certain insects away from cities and buildings. Preventing attraction can be accomplished by choosing light sources displaying a low positive phototactic footprint. Conversely, driving insects away from buildings can be facilitated by exploiting negative phototactic behavior. Indeed, many establishments in the food industry rely on insect traps with UV enriched light to lure insects away from the kitchen or storage areas. The negative phototaxis of certain insect species, e.g. cockroaches, can also be leveraged to achieve similar effects.

In agriculture, greenhouses are spaces where temperature, humidity and lighting conditions can be controlled for optimizing yields. The lighting conditions in greenhouses have been increasingly used as a tool for integrated pest management. Light-based methods for reducing the presence of harmful insects include using phototactic behavior for luring and trapping insects, creating competing visual stimuli to disrupt the navigation process of pests; adding radiation with harmful or inhibitory wavelengths to kill or supress pest populations; providing time cues to influence daily rhythm; and the use of plastic filters to remove UV from daylight.

As an inalienable part of the food chain, insects are a source of nutrition to a wide range of animal species, including livestock and humans. The Food and Agriculture Organization of the United Nations (FAO) published a paper in 2013 advocating insects as a viable source of food security in the face of steep population growth. Indeed, it is estimated that insects form part of the traditional diets of at least 2 billion people. More than 1 900 species have been reportedly used as food. Insects also play a beneficial role as pollinators in plant reproduction, as agents of waste bioconversion, as biocontrol for harmful pest species, and as producers of honey and silk. Farming insects for economical active purposes is thus an economically attractive activity in which lighting plays an important role for supporting mating, oviposition, eclosion, and growth rate of insects.

Insect behavior is a dynamic process in which environmental conditions interact with endogenous states to elicit specific responses. Since natural environmental conditions usually change in a predictable periodic manner, insects have evolved mechanisms to anticipate such changes and adapt accordingly. As a consequence, the manifested behavior of insects is rich in cycles that closely match diurnal or seasonal patterns.

Due to the need of specialization in a complex ecosystem, different species of insects have differentiated response to environmental stimuli: some species begin to swarm in early spring, while others in midsummer; some insects display strong positive phototaxis to the green light while others do not. Not only do insect responses to environmental stimuli vary between species, but they often change within the lifecycle. Some species of termites for instance are attracted to light during their winged phase but are repelled by it after losing their wings.

This variability of insect response to external conditions within and between species means that the insect population in a given area is constantly changing over time as insects are triggered to mate, migrate or look for shelter. A changing population allied to the differentiated response of each species represents a challenge for creating solutions to influencing insect behavior with broad range effectiveness over time. In the particular case of lighting solutions for example, if the intended effect is to reduce the attraction of insects to the illuminated area, the efficacy may be high during a certain season when the insect population is primarily comprised of specimens who reject the light, but poor in another season when other specimens who do not reject the light are present.

SUMMARY OF THE INVENTION

The invention is defined by the claims.

According to one aspect, there is provided an insect control system, comprising:

a light source arrangement comprising one or more light sources with tuneable spectrum, polarization, intensity and/or flickering pattern such that the light source arrangement has at least two settings with different spectrum, polarization, intensity and/or flickering pattern, wherein one setting is for attracting a particular type of insect more than the other setting, and wherein the two settings have the same visual appearance to a human.

The CIELAB color space is a way of defining coordinates for a particular color. It describes all the colors visible to the human eye and was created to serve as a device-independent model to be used as a reverence. The CIELAB color space is derived from the CIE 1931 XYZ color space which can predict which spectral power distributions will be perceived by humans as the same color but not particularly perceptually uniform. The intention of the LAB system is to create a color space that can be computed from simple formulas from the XYZ space but is more perceptually uniform than XYZ.

Perceptually uniform means that a change of the same amount in a color value should produce a change of about the same visual importance. When colors are stored in limited precision values this can improve the reproduction of tones.

The lightness (L*) (the star suffix is to differentiate the L* from the L in Hunter's model) correlate in CIELAB is calculated using the cube root of the relative illuminance. The Lab space is designed to approximate human vision. It aspires to perceptual uniformity and its L* component closely matches human perception of lightness. L*=0 yields black and L*=100 yields diffuse white, specular white may be higher. a* denotes the color's position between red/magenta and green, negative values of a* indicate green whilst positive a* values indicate magenta. b* denotes the color's position between yellow and blue, negative b* values indicate blue and positive b* values indicate yellow.

Since the L*a*b* model is a three-dimensional model, it can only be represented properly in a three-dimensional space and because the red/magenta-green and yellow-blue opponent channels are computed as differences of lightness transformations of cone responses, CIELAB is a chromatic value color space.

The nonlinear relations for L*, a*, and b* are intended to mimic the nonlinear response of the eye. Furthermore, uniform changes of components in the L*a*b* color space aim to correspond to uniform changes in perceived color, so the relative perceptual differences between any two colors in L*a*b* can be approximated by treating each color as a point in a three-dimensional space (with three components: L*, a*, b*) and taking the Euclidean distance between them.

The values of the a* & b* allow hue and Chroma; to be calculated when the coordinates are converted from rectangular to polar form. Hue is the angular component of the polar representation whilst Chroma is the radial component. These can be calculated using the formula;

$$h_{ab} = a\tan 2(b^*, a^*)$$

Chroma is the perceived intensity of a specific color and hue is the degree to which a stimulus can be described as similar to or different to stimuli that are described as red, green, blue or yellow (the unique hues).

Furthermore the International Commission on Illumination (CIE) call the distance between two colors $\Delta E^*_{ab}$, different studies have proposed differing $\Delta E$ values that have a Just Noticeable Difference (JND) ranging from 1.0 to 2.3. This is an important consideration as a certain $\Delta E$ that may be insignificant between two colors that the eye is insensitive to may be more conspicuous in another part of the spectrum.

For the purposes of this system, two light settings have the same visual appearance if their difference is noticed by naked-eye subjects with a change no greater than 50% under intended-use normal conditions."

This system makes use of light sources which have at least two settings, with one attracting insects more than the other. The light source can be designed for a particular insect, or else it may be controllable to many different settings depending on the type of insect and desired response. To provide one setting which attracts insects more than the other, there may be one insect attracting setting and a neutral setting, or one insect repelling setting and a neutral setting, or one insect attracting and one insect repelling setting. Thus, the term "attracting more" should be understood to include and be equivalent to "repelling less". Depending on the insect type, it may be possible to design a light source either to attract or repel the insect, or indeed both may be possible. By making the two settings to be perceived by a human as the same, the insect control does not disturb the user of the system, even when changing between different dynamic settings.

A controller can be provided for controlling the light source arrangement to the desired setting.

The light source arrangement can comprise a set of light sources which are independently controllable by the controller. This enables the control of movement of insects between multiple light sources, so that they can be moved to desired locations, which may be different at different times. However, this control can be achieved without disturbing the user since the visual perception of the light sources remains the same.

A user input interface can be provided for providing user insect control commands to the controller for selecting an insect type and a desired insect response. In this way, the lighting system can be adaptable for different types of insect. The controller can comprise a memory which stores a database of insect types and their responses to different lighting stimuli.

The system can be used indoors, with at least one light source for illuminating a first area in the home, and at least one light source for illuminating a second area in the home, such that the insect control system is for moving insects between the areas.

In another aspect, there is provided system comprising a controller for controlling the light sources to a desired setting, wherein the controller is adapted to control the set of light sources in a sequence, wherein different light sources preferentially attract or repel a particular type of insect at different times. This system makes use of different light output characteristics to provide a desired control of insect behavior at different times. At one time in the sequence, insects are preferentially attracted to one location and at another time they are preferentially attracted to another location. By using multiple light sources, the insects can be induced to move between light source locations, so that they are kept away from a user's desired location. Different lighting conditions are provided at different locations at a given time, to provide movement of insects preferentially towards or away from one location.

In an outdoor system, the sequence can be for inducing a wave of insects which propagate along a path of the light sources towards an insect processing area. This insect processing area can be a neutralization area or it can be a natural area away from people.

A detection system can be used for detecting insects in the vicinity of each light source, for providing automated controller operation in response to the insect detection. For example the timing of the sequence can be controlled to control the speed of propagation of the wave in dependence on the insect detection.

Another aspect provides an insect control system, further comprising;

a user input interface for providing user insect control commands to the controller for selecting an insect type and a desired insect response.

This system makes use of different light output characteristics to provide a desired control of insect behavior at different times. This system can be used to attract insects to one location or repel them from that one location, if there is only one light source. Thus, the system can use a single light source. If using multiple light sources, the insects can be induced to move between light source locations, so that they are kept away from a user's desired location.

Thus, different lighting conditions can again be provided at different locations at a given time, to provide movement of insects preferentially towards or away from one location.

Alternatively, different lighting conditions can be provided (only) to one location over time, to provide different insect responses at different times.

The controller converts the desired insect behavior specified by a user into appropriate lighting control signals. The system can thus provide a lighting solution with tuneable properties which can be used for influencing insect populations with broad range effectiveness over time.

The controller preferably comprises a memory which stores a database of insect types and their responses to different lighting stimuli. In this way, the desired response of a particular insect type can be specified by the user, and the controller can then derive appropriate lighting control signals. The system can operate to a timing set by the user, but it can additionally have an automated control operation, in which a detection system is used for detecting insects, and for providing automated controller operation in response to the insect detection.

In all aspects which make use of multiple light sources, they can be controlled independently to create an insect response which is dependent on the different insect responses to the different light outputs at different locations.

Taking the example of insect control using spectral content control, by providing some light sources in which the spectral energy is concentrated in wavelengths for which the target insects are less sensitive, the insects are less attracted to these light sources. The illuminated space will then display fewer insects than those illuminated by a broader spectrum lamp (providing a comparative repellent effect). Similar effects can be obtained (depending on the insect type) based on polarization, flickering pattern or intensity. For example, flickering patterns can be used to disturb insects, and polarization control can be used to disorient insects.

According to another aspect, there is provided an insect control system, comprising a light source arrangement comprising a set of light sources, a first group of which have a first spectrum, polarization, intensity and/or flickering pattern setting for insect attraction and a second group of which have a second spectrum, polarization, intensity and/or flickering pattern setting for insect repulsion, wherein the set of light sources are configured with the first setting light output facing a first direction and the second setting light output facing a second direction, to attract insects along the first direction.

This system enables insects to be induced to move over larger distances than can be achieved with individual light sources, by creating a chain of light sources. At any point along the chain, the light seen by the insects induces them to move in one direction. The first and second directions are preferably 180 degrees apart.

Another aspect provides a method of controlling insect movement, comprising:

controlling a light source arrangement which comprises one or more light sources with tuneable spectrum, polarization, intensity and or flickering pattern to provide at least two settings with different spectrum, polarization, non-zero intensity and or flickering pattern at different times; wherein one setting is for attracting a particular type of insect more than the other setting, and wherein the two settings have the same visual appearance to a human.

This method enables insect control which is imperceptible to a user.

Another aspect provides a method of controlling insect movement, further comprising:

independently controlling the set of light sources in a sequence to induce a wave of insects which propagate along a path of the light sources towards an insect processing area.

This method enables insects to be dynamically moved over a longer distance than is possible with a single light source, by creating a wave of travelling insects.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an insect control system having a light source arrangement comprising one or more light sources with tuneable spectrum, polarization, intensity and or flickering pattern. The system enables a particular type of insect to be attracted or repelled in a particular time period.

A first example makes use of a light source or set of light sources which is controlled to provide a desired effect on the behavior of the insects in the region of the light source output. The light sources can have spectrum, polarization, intensity and flickering patterns which can be tuned by a controller.

This first example can be applied to a single light source or a set of light sources controlled in the same way.

A tuneable light spectrum can be achieved by using multiple LEDs with different spectra and combined in separate channels for independent control. A specific spectral profile is then achieved by adjusting the current level in each channel. The output of each LED light source can then be blended via an optical system placed at the light exit of the lamp.

Tuneable polarization can be achieved with the aid of a liquid crystal tuneable filter embedded into the optical system. The filter comprises a polarization layer in which the output light is filtered to vibrate in a preferential direction followed by a liquid crystal layer that applies a twisted nematic field effect to rotate the polarization in accordance with an applied electrical field.

Tuneable intensity can be achieved by controlling the electrical current level driving the LED light output.

Tuneable flickering can be achieved by pulse modulating the LED drive current.

Note that these different ways of providing a controllable light output can be used in all examples given below.

Figure 1:
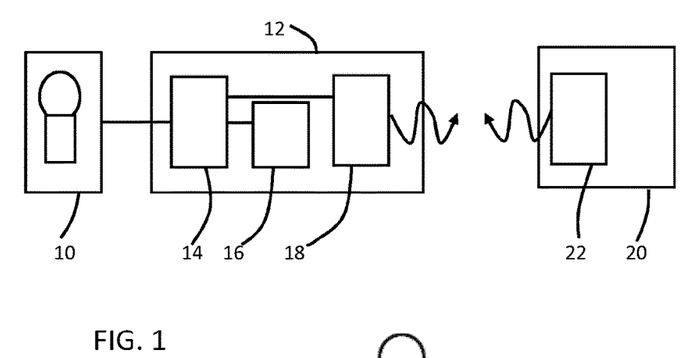
FIG. 1 shows an example of insect control system.

FIG. 1 shows the system architecture in schematic form. The system comprises the light source arrangement 10 and its controller 12. The controller 12 comprises an LED driver 14, a memory 16 and a communications interface 18. The communications interface 18 can comprise a direct user input interface, although the example of FIG. 1 shows a remote controller 20 with its own communications interface 22 for wireless control of the system.

The remote controller 20 is used to set the parameters of the tuneable light source, and this can be implemented as a smart phone, a tablet computer or a desktop computer. The communication between the light source controller 12 and the remote controller 20 can be carried out via a wireless interface implementing Bluetooth or any other standard protocol.

The remote controller 20 provides an interface to the user through which he/she can configure and deploy a recipe for influencing insect behavior.

Figure 2:
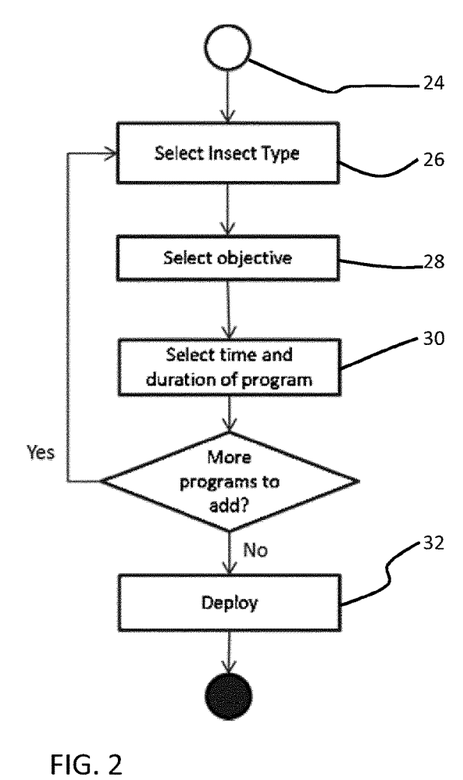
FIG. 2 shows an example of insect control method.

FIG. 2 shows an example method for controlling the system.

The memory 16 contains a database of insects and respective responses to different light stimuli.

The method starts in step 24. In step 26, the user selects a type of insect. The system presents a list of potential objectives to the user, e.g. repel or attract. The database of insects can be grouped by geographic regions so that the user restricts his or her choice to the type of insect present in the target location.

The user selects an objective in step 28. The user then has the option of defining a certain time interval in which the light settings will be operational. The timing information is input in step 30.

Multiple time intervals can be defined by repeating steps 26,28,30. After all schedules have been entered, the programmed settings are deployed in step 32. After the defined time interval or time intervals, the light source can change to a default setting or can simply turn off.

In an additional embodiment of the system, a microphone or camera can be added to detect the present of specific types of insect in the environment and automatically select and deploy suitable light settings to induce the pre-selected behavior. Compared to the scheduled deployment, this approach enables on-demand activation of the system.

In yet another embodiment of the system, additional constraints can be offered to the user in terms of color temperature, color rendering indexing or any other photometric aspect of the light output. The system can limit the range of objectives for a given type of insect to those achievable when taking into consideration the given constraints.

In yet another embodiment a GPS chip can be integrated into the system. A micro controller with pre-sets can then be integrated into the light source. Based on the geographical location of the light source the microcontroller can adapt at least one lighting parameter to the local insect life.

In another embodiment, instead of a GPS chip, a clock can be integrated and the lighting can be adapted to the seasonal and daily activity of the insects. If necessary, the settings in the microcontroller can be adapted to the local insect life as factory settings (when it is known the geographical target is for that product). The clock can be adapted to the local time zone either manually or in the factory.

In another embodiment the light source can have a manual control switch to adapt the light to the local insect life: insect types, geographical location, time zone and/or attract or repel function.

In another embodiment the light source can be tuned to keep the combined color point of the different channels of the light source the same while changing the spectral output. Although the spectrum will change, the appearance of the light source can remain the same.

A second set of examples makes use of a set of light sources which are controlled independently and in a coordinated way to create an insect response which is dependent on the different responses to the different light outputs.

In particular, two strategies can be employed, and these will be termed "chained pumping" and "blind choice". The purpose of chained pumping is to extend the range over which the insect behavior is controlled, to enable insects to be moved from one place to another that is much farther away than would be possible without the method. Blind choice is intended to influence the distribution of insects in an environment by offering them choices that are distinguishable to them but not to humans (and thus blind from the user's perspective).

Figure 3:
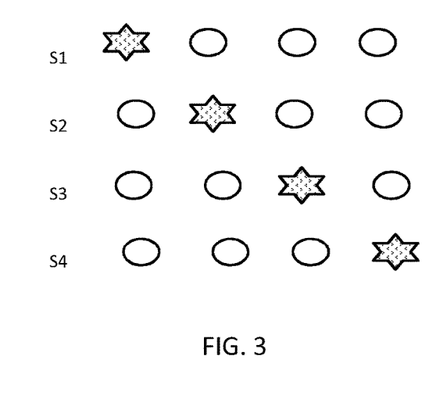
FIG. 3 is used to explain another insect control method.

As explained above, insects that display phototaxis (locomotory movement in response to light stimulus) can be lured from one position to another with light. If phototaxis is positive (movement occurs in the direction of light), the light lure must be placed in the location where the insect is to be attracted. If the insect is, however, to be attracted to a farther location, this can be achieved by a chain of lures that operate in a coordinated fashion as illustrated in FIG. 3, which shows a sequence of steps S1 to S4. The control of four light sources is shown, and each step involves the timely switching of lamps on (shown as stars) and off. Each step brings the insects farther away from their original position.

In this arrangement, the light sources can be switched on to off (so that one setting is with a zero intensity). Alternatively, the light sources can be switched between different settings, whilst remaining illuminated.

The advantage of this chained pumping is that an insect can be moved as far away as desired from its original position. When the insect is at a safe distance, it can be eliminated by fumigation or electrocution without disturbing humans.

Thus, the chained pumping approach means insects are progressively lured from one location to another by switching lamps on and off in sequence, creating an insect pump effect.

Turning on and off light to influence the spatial distribution of insects can be disturbing to humans because it is a perceptible strategy. An alternative approach is to offer the insect a choice between two or more light sources in each step of the chained pump, in a way which is not perceived to the (human) user of the system.

Given multiple light stimuli, insects which display preferences in their phototaxic behavior will consistently move towards the one that better matches their preferences. The differences perceived by insects are, however, not necessarily perceived by humans since the visual systems of different classes of animals greatly differ.

The human eye contains three color receptors that respond to the cumulative energy from a broad range of wavelengths. This cumulative response means that it is possible to perceive light sources with different spectral power distributions as having the same quality (metamerism). Other animal species will contain a different number of receptors with different spectral responses, and therefore will perceive light in a different way than humans. This difference can be leveraged to create light sources that are distinguishable to insects, but not humans, and this is the "blind choice" approach outlined above.

Figure 4:
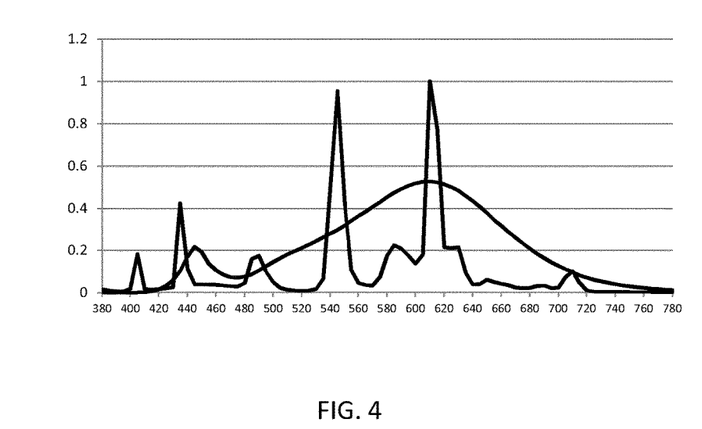
FIG. 4 is used to explain how light outputs which appear the same to a user can influence insects in different ways.

FIG. 4 gives an example of the spectral power distribution of two light sources (showing normalized intensity versus frequency) that have the same color temperature and color rendering indices and therefore look practically undistinguishable to human eyes. However, the spectral power distribution greatly differs between them. These sources can then be used to create blind choice mechanisms to insects that display preferential phototaxic behavior towards one of them.

Figure 5:
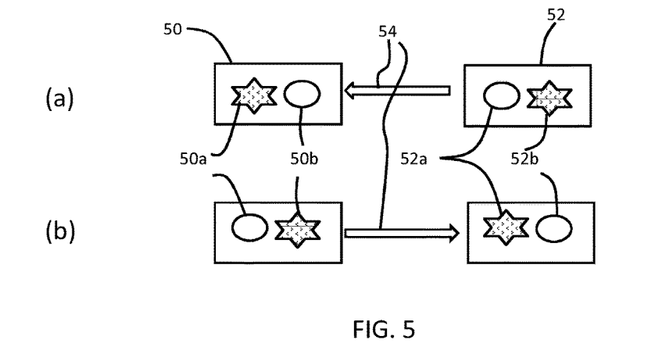
FIG. 5 is used to explain another insect control method.

The blind choice mechanism is represented in FIG. 5. Two light sources 50,52 each capable of emitting light from two different lighting elements 50a,50b and 52a,52b are depicted in different modes of use. Although the insects display phototaxic preferences between the two lighting elements, humans cannot distinguish between them.

FIG. 5 shows the direction of insect movement as the arrow 54. FIG. 5(a) shows light source 50a and 52b operated and light sources 50b and 52a are turned off, and FIG. 5(b) shows light source 50b and 52a operated with light sources 50a and 52b turned off. Light source a in each case attracts the insect preferentially over light source b. However, for humans, the two conditions represented are undistinguishable.

This "blind choice" approach thus involves attracting and repelling insects by taking advantage of the different characteristics of light emitted by two different adjacent light sources. The "chained pumping" approach influences the movement of insects along a particular trajectory by controlling light sources which alternate between emitting light that has favorable and unfavorable characteristics in a coordinated wave-like manner.

In the "chained pumping" approach, the speed of propagation of the light wave can be based on the number of insects being attracted to or repelled by the light and their capability of following the light wave. The insects can eventually be attracted into a chamber where they are subsequently neutralized.

For the blind choice or chained pumping approaches, the system comprises at least two light sources (i.e. luminaires), each of which is capable of emitting light with at least two different spectra. These light sources are independently controllable. The system can thus be as shown in FIG. 1 in which the light source arrangement 10 comprises the multiple light sources. As explained above, the system can use sensors to assess the quantity and possibly also type of insects in the vicinity of each luminaire. These elements can be combined to enable various scenarios to be implemented.

Figure 6:
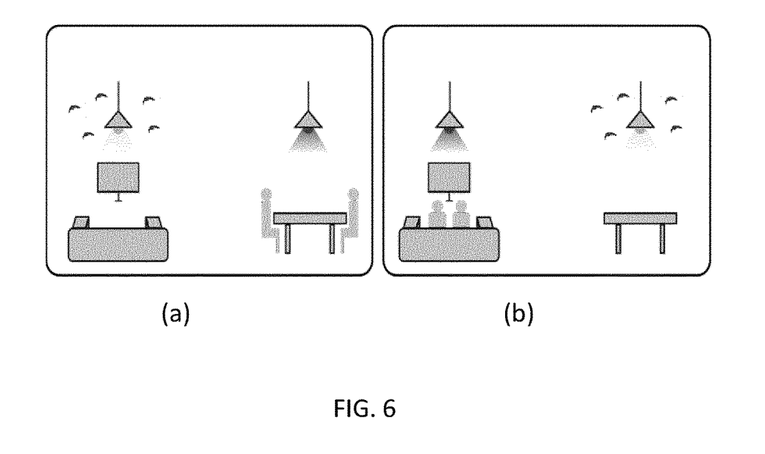
FIG. 6 shows an insect control system applied to a lounge and dining area.

A first approach is considered, for an indoor solution as shown in FIG. 6, which shows a living area to the left and a dining area to the right.

During dinner as shown in FIG. 6(a), the occupants switch the light in the dining room to the unfavorable light while the light in the living room is switched to the favorable light. This causes the insects to move to the favorable light in the living room thus minimizing discomfort for the occupants having dinner. After dinner, the occupants decide to move to the living room. At this point and as shown in FIG. 6(b), the light in the living room is set to the unfavorable mode while the light in the dining room is set to the favorable mode. The insects now move to the dining area thus allowing the occupants to watch television in the living room without being disturbed.

Figures 7, 8:
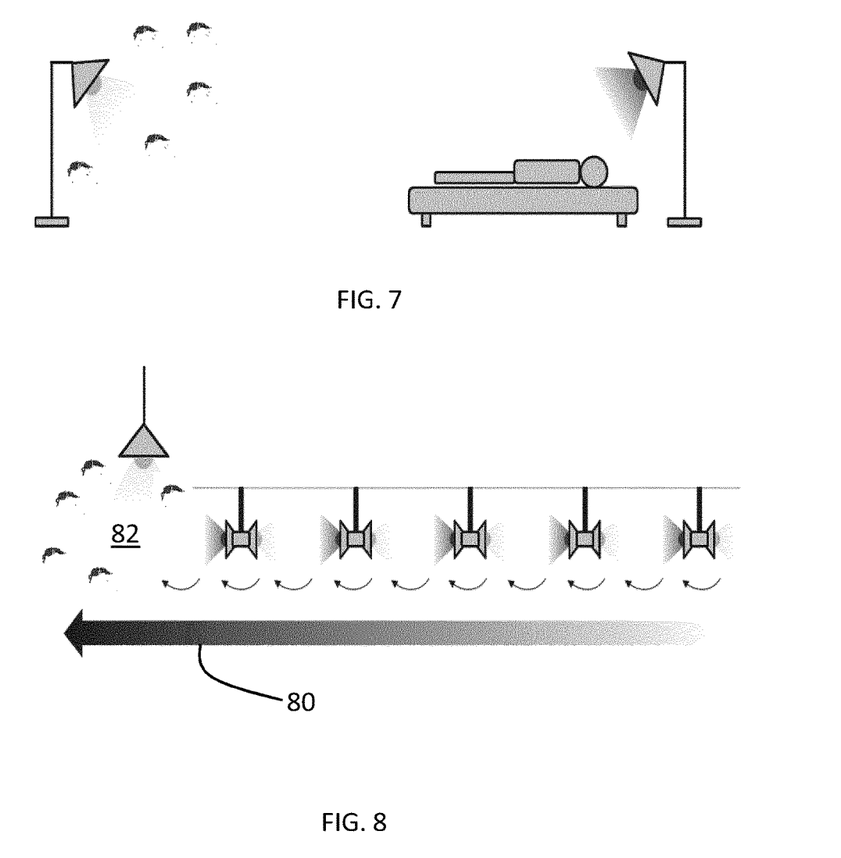
FIG. 7 shows an insect control system applied to a bedroom area.
FIG. 8 shows a passive insect control system applied to an outdoor area.

FIG. 7 shows a second approach, applied to a bedroom. At night when the occupant is lying in bed reading a book, there can be two lights in the room. The unfavorable light could be placed next to the occupant lying in bed while the favorable light could be placed at another corner of the room far away from the bed. This would ensure that the occupant is not disturbed by insects (e.g. moths) while lying in bed.

FIG. 8 shows a third approach, which can be applied to a corridor. The two scenarios described above make use of static differences in lighting characteristics covering a small geographic area. This concept of static differences in lighting can also be extended to cover a larger geographic area by using a large number of luminaires placed in the linear fashion as shown in FIG. 8. Each luminaire contains two lamps pointing in opposite directions. One lamp will emit favorable light while the other will emit unfavorable light.

The idea is that insects that might initially be attracted to a particular luminaire will fly around in the vicinity of the favorable light. However, as a certain degree of randomness is inherent in the flight path of the insects, there is a possibility that the insects will end up on the side of the unfavorable light. From this vantage point, insects positioned on the side of the unfavorable light will also be able to see the favorable light in the adjacent luminaire. This will then attract the insect to the next luminaire and the process will repeat, giving a general insect movement as shown by arrow 80. The insect is eventually led to a particular location where it can either be neutralized or simply led away to another area 82 where the presence of insects will not pose any interference in daily activities. This is essentially a passive implementation of the "chained pumping" approach.

This approach involves the use of a set of light sources, of which a first group has a first spectrum, polarization, intensity and/or flickering pattern setting for insect attraction and a second group has a second spectrum, polarization, intensity and/or flickering pattern setting for insect repulsion. The light sources are configured with the first setting light output facing a first direction and the second setting light output facing a second direction, to attract insects along the first direction.

A fourth approach is an active approach which uses dynamic differences in lighting characteristics. For covering larger areas in an indoor or outdoor (e.g. city-wide) environment, a "light wave" made up of favorable and unfavorable light characteristics can be made to propagate through a set of lamps to actively control the movement of insects along a particular trajectory.

Figure 9:
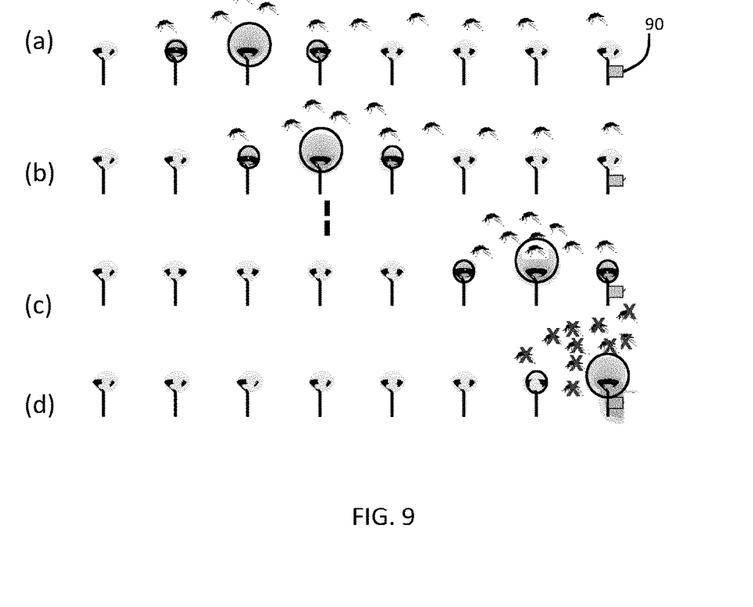
FIG. 9 shows an active insect control system applied to an outdoor area.

FIG. 9 shows this fourth approach applied as an outdoor, city-level solution, in which light poles are deployed throughout a city.

FIGS. 9(a) to 9(d) show sequential time instants. The bold circles represent light poles illuminated to attract insects, and the circle size represents the intensity. As shown, the region of attraction spans three light poles and it progresses from left to right over time.

In this way, a wave made up of favorable and unfavorable lighting traverses from one pole to another at a constant velocity. As a favorable light spectrum shifts gradually from one light pole to another, the insects also follow the wave and move along the light poles. This technique is used to actively lead the insects to a particular location, in particular the light pole at the right, which includes an insect neutralizer 90 or it can lead the insects to a region which does not interfere with human activity at night, e.g. a forest/nature reserve.

An extension to the example of FIG. 9 is to vary the velocity of the wave depending on any factor that could increase the effectiveness of attracting and subsequently leading insects along a certain path. For example, if every lamp is able to use one or more sensors (e.g. acoustic, camera, etc.) to estimate the number insects attracted to it, every lamp could adapt the rate of flow of the light wave depending on the rate of transfer of the insects from one lamp to another. The system could also be tuned differently to target specific species at different times of the year which are known to have different flying capabilities. For example, species A (which appears mostly at the end of spring) might be capable of flying much faster than species B (which appears at the end of summer). Thus the system can then be tuned such that the light wave traverses faster in spring than in summer.

The system described above can utilize the effect of light on insect behavior to improve well-being at home, office, hospitals or entire cities by moving burdensome insects away from areas where people are, to areas where they cause no harm or can be exterminated with no collateral effect.

It will be apparent from the various examples above, that some implementations can make use of a controller so that a user can specify an insect type and desired response, and other implementations can have a simpler control interface—for example one setting to move insects to a first location and another to move them to a second location. The system can be designed for one specific insect type, in which case no user input in respect of insect type is needed. Some implementations can make use of a single light source only, whereas others can use the interplay between multiple light sources. Similarly, some implementations are desirable with the light source changes imperceptible to the user, whereas others will not require this feature.

The system can be embedded in lighting products destined to the consumer and professional markets. Consumers, especially those in regions of the globe where insects represent a burden, can use the system to keep undesirable insects away from their homes throughout the year by reducing or reversing their attraction to light sources. A similar solution would also benefit the food industry, which is interested in keeping disease transmitting insects away from their facilities. The light solution can also be deployed as part of public health initiatives to reduce vector borne diseases in affected areas. The professional market also includes greenhouses in which the beneficial activity of insects is to be promoted, e.g. pollination, while discouraging the presence of pests.

The invention has been described as an insect control system. The database with lighting information can additionally include relevant settings for other animals such as (migratory) birds, bats, turtles and fish.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An insect control system, comprising:
a light source arrangement comprising one or more light sources with a tuneable spectrum or polarization such that the light source arrangement has a first spectrum and a second spectrum, or a first polarization and a second polarization, wherein the first spectrum or first polarization is for attracting a type of insect more than the second spectrum or second polarization, and wherein the first spectrum and second spectrum, or the first polarization and the second polarization have the same visual appearance to a human.

2. The system as claimed in claim 1, further comprising:
a controller for controlling the light source arrangement to a desired setting.

3. The system as claimed in claim 2, wherein the one or more light sources of the light source arrangement are independently controllable by the controller.

4. The system as claimed in claim 2, comprising a user input interface for providing user insect control commands to the controller for selecting the insect type and a desired insect response.

5. The system as claimed in claim 4 wherein the controller comprises a memory which stores a database of insect types and their responses to different lighting stimuli.

6. The system as claimed in claim 1, comprising an indoor system, wherein a first light source of the light source arrangement is for illuminating a first area in a home, and a second light source of the light source arrangement is for illuminating a second area in the home, such that the insect control system is for moving insects between the first and second areas.

7. The system as claimed in claim 1, comprising an outdoor system, wherein the controller is adapted to control a first light source of the light source arrangement at a first time, and the controller is adapted to control a second light source of the light source arrangement at a second time, such that the first and second lights are controlled in a sequence, said sequence is for inducing a wave of insects which propagate along a path of the light sources towards an insect processing area.

8. The system as claimed in claim 7, further comprising a detection system for detecting insects in a vicinity of each light source, and for providing automated controller operation in response to the insect detection.

9. The system as claimed in claim 8, wherein the sequence is controlled to control a speed of propagation of the wave in dependence on the insect detection.

10. A method of controlling insect movement, comprising:
controlling a light source arrangement which comprises one or more light sources with tuneable spectrum or polarization to provide at least two settings with different spectrums or polarizations at different times; wherein one setting is for attracting a particular type of insect more than the other setting, and wherein the two settings have the same visual appearance to a human.

11. The method of controlling insect movement according to claim 10, further comprising:
independently controlling a first light source of the light source arrangement and a second light source of the light source arrangement in a sequence to induce a wave of insects which propagate along a path of the light source arrangement towards an insect processing area.

12. The method of controlling insect movement according to claim 10, further comprising:
receiving a user input providing insect control commands defining an insect type and a desired insect response; and
controlling the light source arrangement to provide the desired insect response.

* * * * *